Jan. 6, 1931.　　T. J. STURTEVANT　　1,788,361
AIR SEPARATOR
Filed April 30, 1929　　4 Sheets-Sheet 1

INVENTOR:
Thomas J. Sturtevant
BY
Henry T. Williams
ATTORNEY

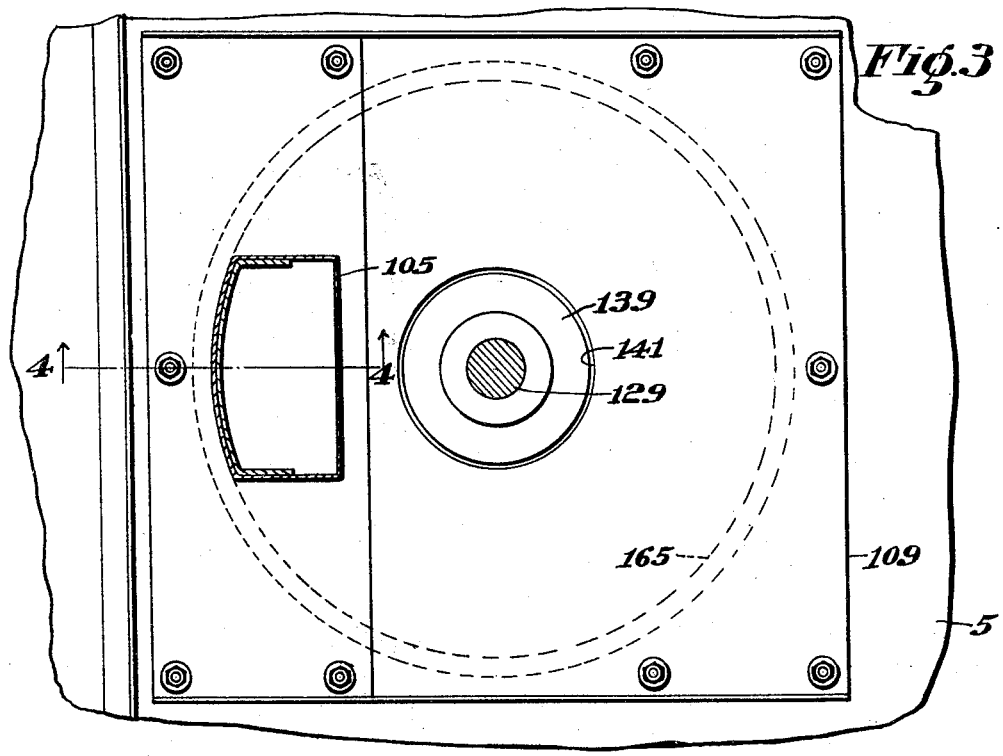
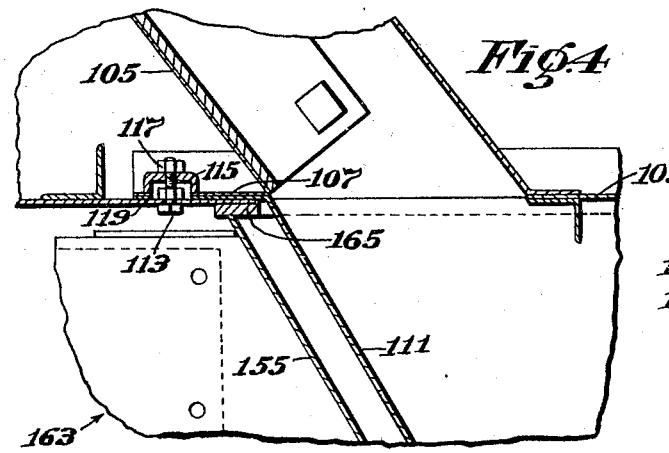
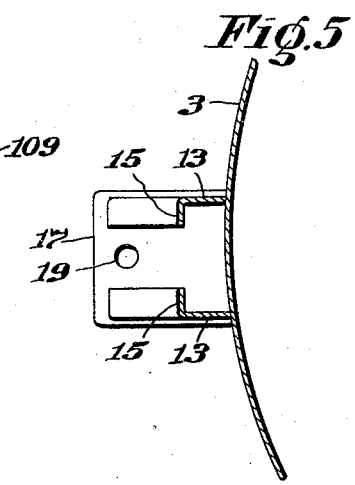

Jan. 6, 1931. T. J. STURTEVANT 1,788,361
AIR SEPARATOR
Filed April 30, 1929 4 Sheets-Sheet 4
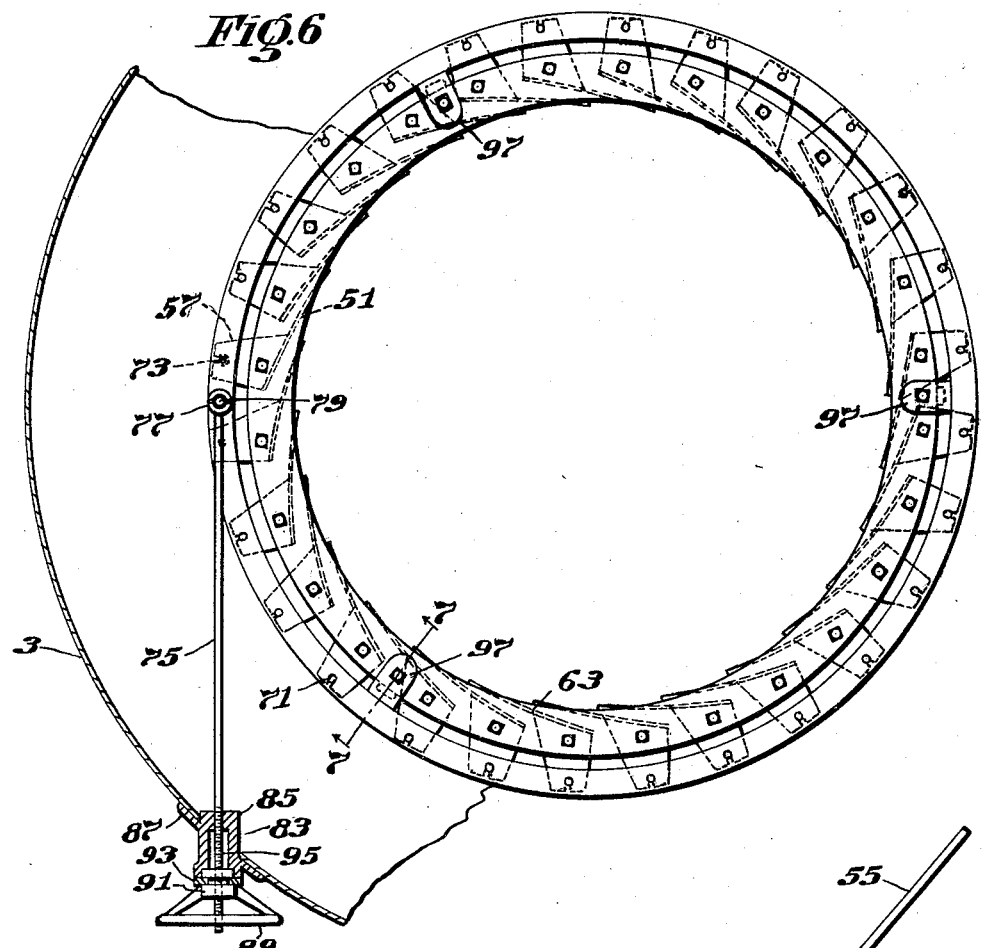
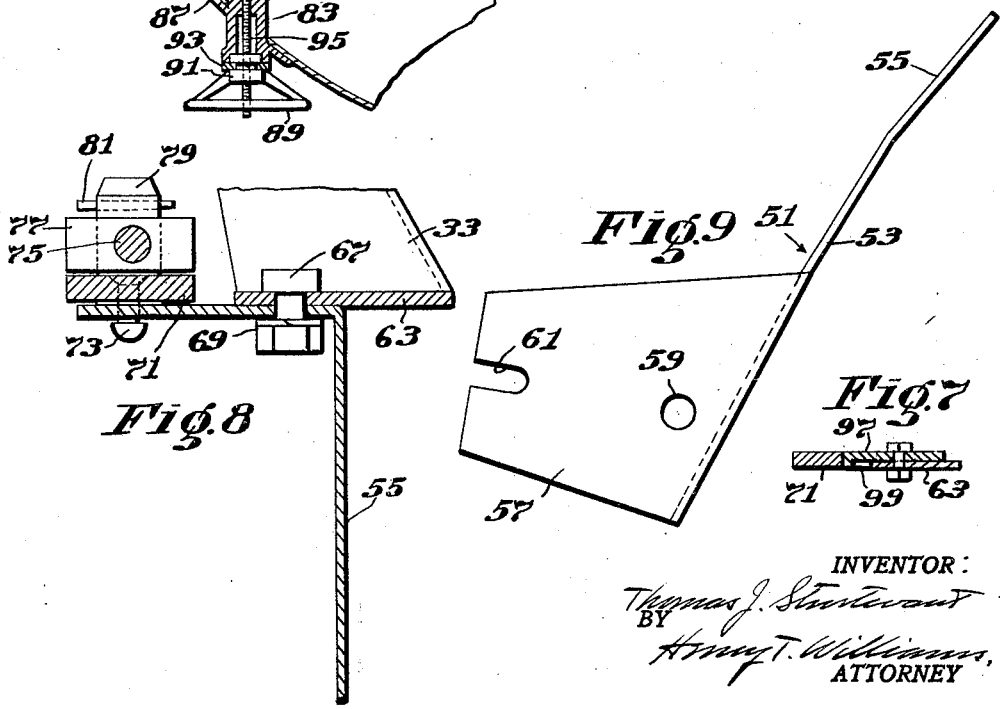
INVENTOR:
Thomas J. Sturtevant
BY
Henry T. Williams,
ATTORNEY Patented Jan. 6, 1931

1,788,361

UNITED STATES PATENT OFFICE

THOMAS J. STURTEVANT, OF WELLESLEY, MASSACHUSETTS, ASSIGNOR TO STURTEVANT MILL COMPANY, OF BOSTON, MASSACHUSETTS, A CORPORATION OF MASSACHUSETTS

AIR SEPARATOR

Application filed April 30, 1929. Serial No. 359,309.

The invention to be hereinafter described relates to air separators for grading materials. The invention is embodied in a separator of the type in which the classification is accomplished by an air current moving upward in a separating chamber and downward in a settling chamber. The air current is induced by a fan and caused to circulate through the chambers, and in its course passes through an inlet opening between the upper and lower shells forming the casing of the separating chamber. The materials to be graded are fed through a hopper into the separating chamber and are received by a rotary distributor which throws the materials out across the rising air current under the influence of centrifugal force. The lighter particles are carried upward by the air current out of the separating chamber over into the settling chamber where they gravitate downward and are delivered therefrom, while the heavier particles gravitate downward through the air current in the separating chamber and are delivered therefrom.

Heretofore, the inlet opening has been provided with a series of spaced vanes for the purpose of preventing coarser particles whirling in the separating chamber, from escaping through the opening into the settling chamber, and also to prevent lighter particles from being carried by the air from the settling chamber through the opening into the separating chamber.

One of the purposes of the present invention is to provide an improved construction and arrangement of vanes promoting efficiency in operation of the separator, and facilitating ready adjustment of the vanes to vary their angles and the spaces between them. The construction is such that the operator can observe the character of the fines and tailings delivered from the separator, and by means accessible externally of the outer casing of the separator can adjust the vanes.

The fan for causing the air to circulate through the separating and settling chambers has a hub extending up from the distributor out of the separating chamber and into the fan chamber. This hub encircles the hopper and is spaced therefrom. It is desirable to prevent any heavier particles being carried up by the air current through the space between the hub of the fan and the hopper, and thence over into the settling chamber. Accordingly, a purpose of the invention is to provide the fan with a conical shell hub which extends up toward and preferably barely clears the head of the outer casing. Means is provided for conveniently moving the fan hub relatively to the casing head with desirable nicety of adjustment.

Still another purpose of the invention is to provide the separator with brackets specially designed to stiffen the outer casing and provide effective means for supporting the separator.

With the aforesaid and other purposes in view, the character of the invention may be best understood by reference to the following description of one good form thereof shown in the accompanying drawings, wherein:

Fig. 1 is a vertical longitudinal section through a separator embodying the invention;

Fig. 2 on an enlarged scale is a vertical section through a part of the upper portion of the separator;

Fig. 2a is a detail of the jack screw device for adjusting the distributor and fan hub longitudinally of the shaft;

Fig. 3 on an enlarged scale is a horizontal section taken on line 3—3 of Fig. 2;

Fig. 4 on an enlarged scale is a vertical sectional detail taken on line 4—4 of Fig. 3;

Fig. 5 is a horizontal section taken on line 5—5 of Fig. 2;

Fig. 6 is a horizontal section taken on line 6—6 of Fig. 1;

Fig. 7 is a sectional detail to be referred to;

Fig. 8 is a vertical section showing the pivotal connection of one of the vanes with its carrying ring and its pivotal connection with the adjusting ring;

Fig. 9 on an enlarged scale is a plan of one of the vanes; and

Figure 10:
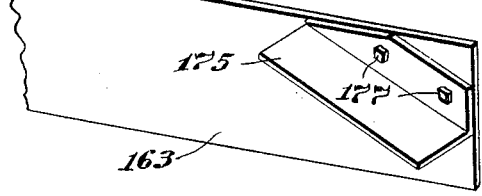

Fig. 10 is a detail showing one of the angle members for attachment to the fan blade.

Figure 1:
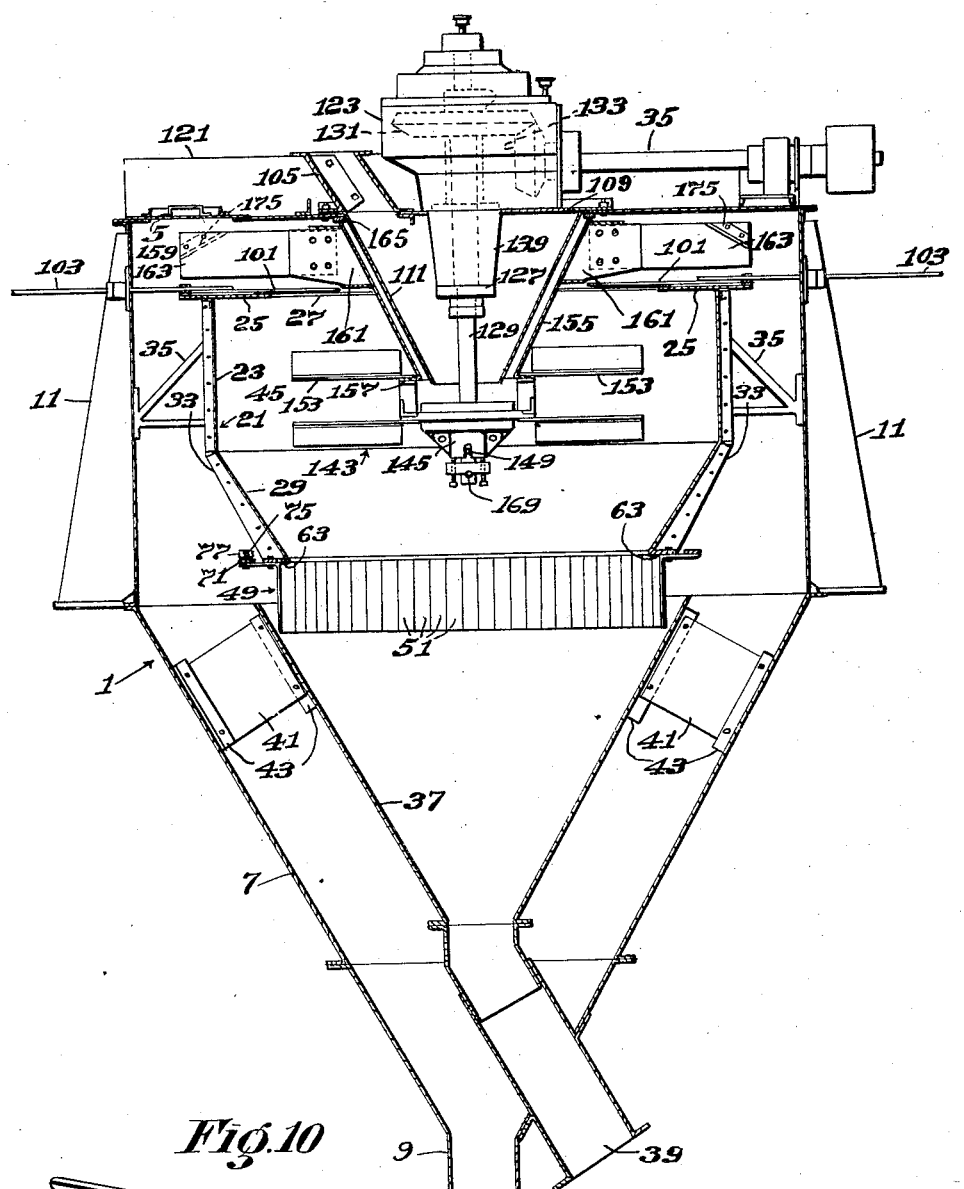
Figure 2:
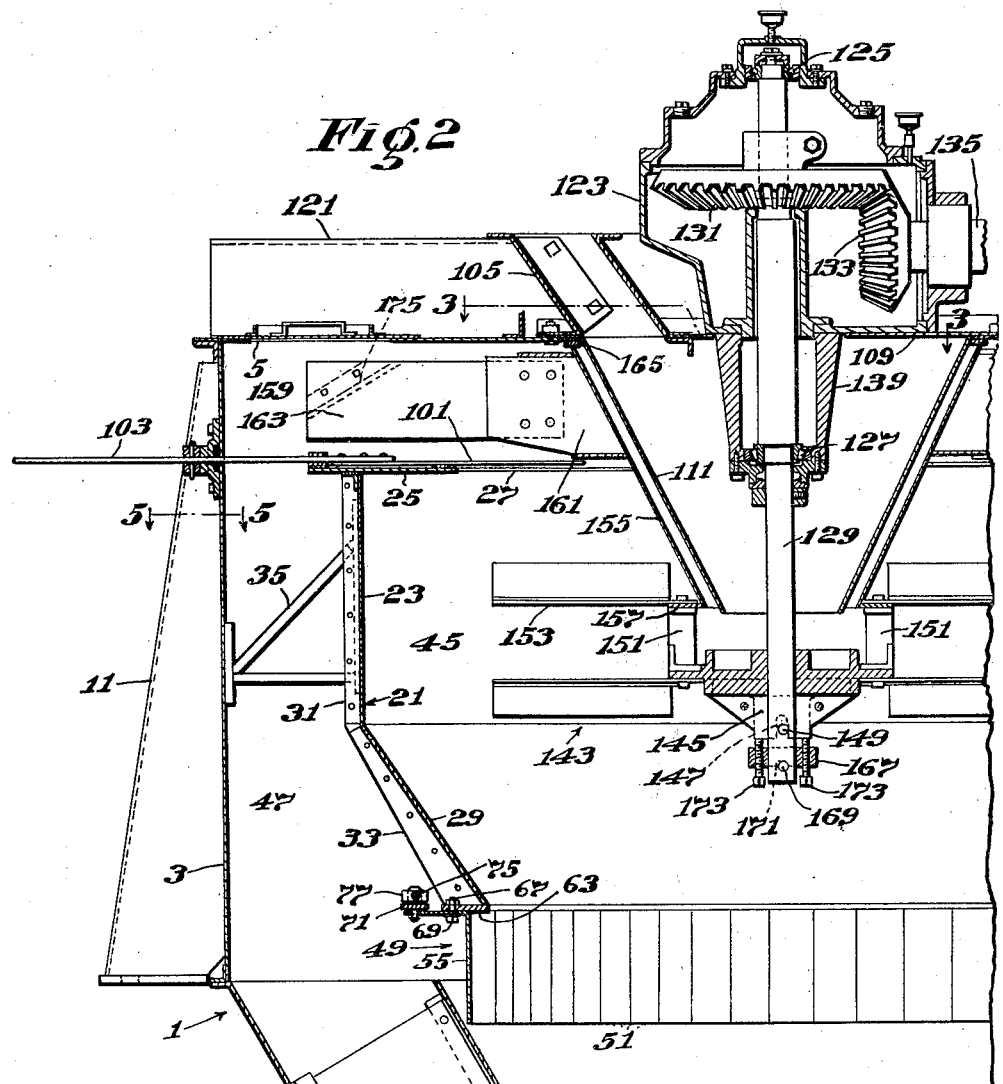
Figure 2A:
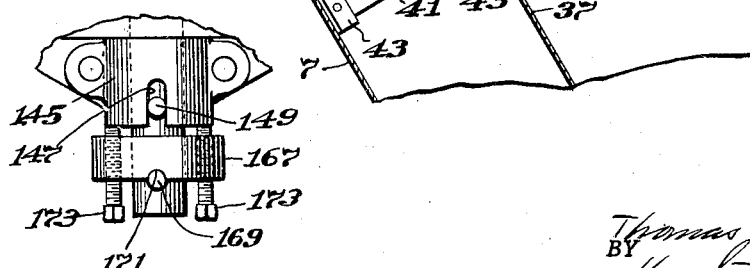

Referring to the drawings, the separator shown therein as one good embodiment of the invention comprises an outer casing 1 (Figs. 1 and 2) consisting of a drum 3 having a head 5 at the upper end thereof and a cone 7 at the lower end thereof terminating in a discharge spout 9. This outer casing is provided with brackets 11 (Figs. 2 and 5) adapted to rest upon and be secured to suitable supports. Each of these brackets comprises a pair of tapered plates 13 having inturned flanges 15 and extending substantially the length of the drum 3. At the lower ends of the flanged plates is a base plate 17 having a hole 19 for receiving a bolt for securing the bracket to its support. The flanged plates may be welded to the base plate, and all of the plates may be welded to the drum 3. The construction is such that a sturdy bracket is provided which contributes to the stiffness of the drum and furnishes an effective support for the separator.

Within and spaced from the outer casing is an inner casing 21 comprising a drum 23 having a head 25 at the upper end thereof with an outlet opening 27 therein, and a conical shell 29 at the lower end thereof, said drum and shell being provided respectively with angle iron stiffening ribs 31 and 33. This inner casing is supported from the outer casing by triangular brackets 35 having their backs welded or bolted to the inner casing drum 23, and their apexes welded to the outer casing drum 3. The construction is such that these brackets will effectively support the inner casing from the outer casing, and yet offer little obstruction to the fines which move downward in the settling chamber adjacent the inner surface of the drum 3.

Beneath and spaced from the lower shell 29 is a conical shell 37 communicating with a discharge spout 39 which extends laterally through an opening in the cone 7 of the outer casing. The conical shell 37 is supported on the outer cone 7 by webs 41 secured to angle bars 43 secured to the shell cone.

In the inner casing 21 is the separating chamber 45 and between the inner and outer casings is the settling chamber 47. The space 49 between the upper and lower shells of the inner casing serves as an inlet opening for the passage of air from the settling chamber into the separating chamber. Located at this space is a series of vanes 51, each having a vertical body 53 (Fig. 9) with a slightly deflected marginal portion 55. Projecting transversely from the upper edge of the body 53 is a flange 57 having a hole 59 and a notch 61 therein.

A ring 63 is welded to the lower edge of the shell 29 and the lower ends of the ribs 33. The vanes depend from this ring, and are pivotally connected thereto by bolts 67 entered through the vane flange holes 59 and registering holes in the ring 63, said bolts being provided with suitable lock washers 69. These vanes are located wholly within the separating chamber, have an overlapped or shingled-like arrangement, and extend down within the lower conical shell 37 with free ends a substantial distance beneath the upper edge of said shell. The edge of the shell is left free, and materials cannot collect thereon to obstruct the inlet opening 49.

As stated, it is desirable to adjust these vanes to vary their angles and the spaces between them to contribute to the most efficient classification. The narrower the spaces between the vanes, the smaller will be the volume of air passing through the inlet opening. To accomplish this adjustment, in the present instance, an adjusting ring 71 (Figs. 6 and 7) is provided, encircling the fixed ring 63 carrying the vanes, and resting upon the flanges 57 of the vanes. The ring is pivotally connected to the vane flanges by pintles in the form of rivets 73 which project through holes in the ring and the notches 61 of the vane flanges.

A rod 75 has an eye 77 at one end thereof receiving a stud 79 secured to the adjusting ring 71, the eye being prevented from escaping from the stud by a cotter pin 81. The opposite end of the rod 75 projects in a bracket 83 having a boss 85, and a collar 87 secured to the outer casing. A hand wheel 89 has a hub 91 provided with a circumferential groove received by a bore in a two-part plate 93 secured to the boss 83, the construction being such that the hand wheel may rotate, but not move axially. The rod 75 has a portion 95 threaded into the hand wheel hub 91. The adjusting ring 71 is spaced somewhat from the vane carrying ring. Secured to the latter at suitable intervals are guide members 97 (Figs. 6 and 7) having outer ends engaged by the inner edge of the adjusting ring. The guides have downwardly projecting lips 99 for engagement with the outer edge of the ring 63 and contribute to proper positioning of the guides. When it is desired to adjust the vanes to vary their angularity and the spaces between them, the hand wheel 89 is grasped and rotated, thereby moving the rod 75 longitudinally in the hand wheel hub 91 and moving the adjusting ring circumferentially.

To vary the opening 27 referred to, in the head of the inner casing, a valve may be provided comprising a series of overlapped plates 101 secured to radial bars 103 which extend through and beyond the outer casing where they are accessible for adjustment to vary the size of the opening. This valve may be similar to that disclosed in Letters Patent No. 1,615,558, granted to me January 25, 1927, and therefore, it is unnecessary to show and describe the same in detail herein.

To conduct materials into the separator, a suitable hopper may be connected to the intake neck 105 having at the lower end thereof an outstanding flange 107 resting upon a plate 109 (Fig. 3) secured to the outer casing head and overlying an opening therein. The materials are delivered by the intake neck 105 to a conical hopper 111 secured to and depending from the plate 109. The margin of the head surrounding the opening, the plate 109 and the intake neck flange 107 are secured together by bolts 113 having cups 115 thereon engaging the flange 107 and held by nuts 117. Within the cups are nuts 119 engaging the flange 107. When it is desired to remove the intake neck, the nuts 117 and cups 115 may be removed without disturbing the bolts 113 securing the plate 109 to the head. When it is desired to remove the hopper 111, the nuts 119 may be removed, thereby enabling removal of the plate 109 and the hopper 111 therewith.

At the top of the separator are channels 121 (Fig. 2) supporting a housing 123 containing bearings 125 and 127 in which is journalled a vertical shaft 129, said shaft being rotated by a bevel gear 131 fast thereon meshing with a bevel pinion 133 on a horizontal shaft 135 journalled in a bearing carried by the housing and an outer bearing 137 carried by a transverse channel on the channels 121. At the outer end of the shaft is a pulley which may be driven by any suitable source of power.

The housing has a neck 139 which projects through a hole 141 in the plate 109 and down into the hopper 111. The shaft 129 projects down beyond the hopper into the separating chamber, and carries a rotary distributor 143 having one part 145 of a hub integral therewith. Opposed to said hub part is a cap 146 having outstanding ears with holes therein registering with holes on ribs projecting from the hub part. Bolts 145a extend through these holes, and may be adjusted securely to clamp the distributor onto the shaft. To further insure a driving connection between the shaft and distributor, the hub may have opposed notches 147 receiving a driving pin 149 entered through the shaft. On release of the bolts 145a, the distributor may be adjusted somewhat longitudinally of the shaft, as will be hereinafter more fully explained. Studs 151 rise from the distributor and carry a baffle plate 153.

The fan for causing the air to circulate through the separating and settling chambers and the inlet and outlet openings comprises a conical shell hub 155 having a flange 157 at the lower end thereof mounted on and secured to the studs 151. This hub is spaced from the hopper 111 and extends from the separating chamber through the outlet opening 27 up into the chamber 159 between the heads of the inner and outer casings. Secured to the hub are plates 161 carrying blades 163.

To prevent materials from passing from the separating chamber up through the space between the hopper 111 and the conical shell fan hub 155, the hub is extended up to and barely clears a ring or band 165 welded to the under face of the plate 109 which forms part of the outer casing head.

To adjust the upper edge of the hub relatively to the ring 165, a ring 167 is provided on the lower end of the shaft 129, and has a pair of notches or seats 169 at the lower side thereof resting upon a transverse pin 171 in the shaft. A pair of jack screws 173 are threaded into tapped holes in the ring and engage the lower end of the distributor hub 145. By adjusting these jack screws the distributor hub may be moved somewhat longitudinally of the shaft so as to bring the upper edge of the conical shell hub of the fan into contact with the ring 165, and then preferably the hub may be retreated so as barely to clear the ring.

In operation, the material to be graded is fed through the hopper 111 to the rotary distributor, and is thrown outward thereby under the influence of centrifugal force. The fan causes the air to circulate in a path upward through the separating chamber through the outlet opening in the head thereof, through the fan chamber, down in the settling chamber, and through the inlet opening and spaces between the vanes back into the separating chamber. The lighter particles of the material will be carried upward by the air in the separating chamber over into the settling chamber and be delivered from the spout 9. The heavier particles will gravitate downward in the separating chamber and be delivered through the spout 39.

The direction of rotation of the fan may be such that the air will be caused to whirl in the separating and settling chambers, and sweep past the overlapping vanes in the direction indicated by the arrow in Fig. 6. Since these vanes are wholly within the separating chamber and have this arrangement, they are very effective in preventing the heavier particles which are gravitating down through the whirling air current from being carried out through the spaces between the vanes into the settling chamber. Also the whirling air in the settling chamber will have a centrifugal effect which will cause the lighter particles gravitating down in the settling chamber to move near to the outer wall thereof, and not be carried by the air through the inlet opening into the separating chamber.

Under certain conditions it may be desirable to promote the turning of the air current moving from the fan chamber into the settling chamber, and to accomplish this, each fan blade may be provided with an angle member 175 (Figs. 1 and 10) disposed obliquely on the blade adjacent the outer end thereof, and secured thereto by bolts 177 entered through registering holes in the flange of the member and in the blade. These angle members may be quickly and easily applied to the blades and removed therefrom as desired.

It will be understood that the invention is not limited to the specific embodiment shown, and that various deviations may be made therefrom without departing from the spirit and scope of the appended claims.

What is claimed is:

1. An air separator for grading materials comprising, in combination, separating and settling chambers having inlet and outlet openings between them, means to cause air to circulate through said chambers and openings and move up in the separating chamber and down in the settling chamber, a series of spaced vanes at the inlet opening and located in the separating chamber, a vane carrying ring at the top of the inlet opening, said vanes having flanges at the upper ends thereof pivotally connected to said ring, an adjustable ring separate from said vane carrying ring and connected to said vane flanges, and means connected to said adjustable ring accessible externally of the separator to move the same circumferentially and vary the spaces between the vanes.

2. An air separator for grading materials comprising, in combination, an outer casing, an inner casing comprising upper and lower shells with an inlet opening between the shells, a separating chamber in the inner casing, a settling chamber between the casings, a series of spaced vanes at the inlet opening having flanges at the upper ends thereof, a fan for causing air to circulate through said chambers and opening, a ring at the lower edge of the upper shell, said vane flanges being pivotally connected to said ring, an adjustable ring encircling said ring and directly connected to and supported wholly by the vane flanges, a rod connected to the adjustable ring and extending through the settling chamber to the outer casing, and means located externally of the outer casing for adjusting the rod longitudinally, to move the adjustable ring circumferentially and vary the positions of the vanes.

3. An air separator for grading materials comprising, in combination, an outer casing, an inner casing comprising upper and lower shells with an inlet opening between them, a separating chamber in the inner casing, a settling chamber between the casings, a member at the lower edge of the upper shell, a series of spaced vanes pivotally connected to said member, said vanes extending down across the inlet opening within and beneath the upper edge of the lower shell, an adjustable ring connected to and supported by the vanes, and means connected to said ring and accessible externally of the outer casing for circumferentially adjusting the adjustable ring to vary the positions of the vanes.

4. An air separator for grading materials comprising, in combination, an outer casing, an inner casing comprising upper and lower shells with an inlet opening between them, a separating chamber in the inner casing, a settling chamber between the casings, a fan for causing air to circulate through said chambers and opening, a ring at the lower edge of the upper shell, a series of vanes having flanges pivotally connected to said ring, and notches at the outer ends of the flanges, an adjustable ring carried by said flanges and having pintles entering said notches, and means connected to the ring accessible externally of the outer casing for adjusting said ring to vary the positions of the vanes.

5. An air separator for grading materials comprising, in combination, an outer casing, an inner casing comprising upper and lower shells with an opening between them, a separating chamber in the inner casing, a settling chamber between the casings, a fan for causing air to circulate through said chambers and opening, a ring on the upper shell, a series of spaced vanes within the separating chamber having flanges pivotally connected to the ring, an adjustable ring pivotally connected to and carried by the vane flanges, guides on the fixed ring engaged by the inner edge of the adjustable ring, and means connected to the adjustable ring and accessible externally of the outer casing, circumferentially to adjust said ring and vary the spaces between the vanes.

6. An air separator for grading materials comprising, in combination, an outer casing having a head, an inner casing having a separating chamber therein, a hopper projecting down from the outer casing head, a shaft projecting down through the hopper, a rotary distributor carried by the shaft, a fan beneath the outer casing head having a hub carried by the distributor and encircling and spaced from the hopper, and means to adjust the distributor and fan longitudinally of the shaft to bring the upper edge of the hub to the head, that materials cannot pass from the separating chamber through the space between the hopper and fan hub into the settling chamber.

7. An air separator for grading materials comprising, in combination, an outer casing having a head, an inner casing having a separating chamber therein, a hopper projecting down from the head, a shaft extending down through the hopper, a rotary distributor having a hub on the shaft with slots therein, a pin extending transversely through the shaft and slots, a fan having a hub carried by the distributor encircling and spaced from the hopper, and jack screws carried by the shaft for adjusting the distributor hub longitudinally of the shaft to bring the upper edge of the hub to the outer casing head.

8. An air separator for grading materials comprising, in combination, an outer casing having a head with an opening therein, a band fixed to the under face of the head around the opening, a hopper projecting down from the opening, a shaft extending down through the hopper, a rotary distributor having a hub on the shaft, means providing a driving connection between the shaft and distributor hub having provision permitting adjustment of the hub longitudinally of the shaft, a fan carried by the distributor having a hub encircling and spaced from the hopper, and means on the shaft operating through the distributor hub to move the upper edge of the hub to said band.

9. An air separator for grading materials comprising, in combination, an outer casing having a head with an opening therein, an inner casing having a separating chamber therein, a hopper projecting down from the opening into the separating chamber, a shaft projecting through the hopper into the separating chamber, a rotary distributor having a hub on and rotatable with the shaft and adjustable longitudinally on the shaft, a fan having a hub carried by the distributor encircling and spaced from the hopper, a ring fast on the shaft, and jack screws threaded in the ring, engaging the distributor hub and adjustable to bring the upper edge of the fan hub to the outer casing head.

THOMAS J. STURTEVANT.